US007808250B2

(12) United States Patent
Honda et al.

(10) Patent No.: US 7,808,250 B2
(45) Date of Patent: Oct. 5, 2010

(54) TEST METHOD AND APPARATUS FOR SPARK PLUG INSULATOR

(75) Inventors: Toshitaka Honda, Iwakura (JP); Hirokazu Kurono, Nagoya (JP); Tomoaki Kato, Nagoya (JP)

(73) Assignee: NGK Spark Plug Co., Ltd., Aichi (JP)

( * ) Notice: Subject to any disclaimer, the term of this patent is extended or adjusted under 35 U.S.C. 154(b) by 298 days.

(21) Appl. No.: 12/130,120

(22) Filed: May 30, 2008

(65) Prior Publication Data

US 2008/0315895 A1 Dec. 25, 2008

(30) Foreign Application Priority Data

Jun. 22, 2007 (JP) ............................. 2007-164555

(51) Int. Cl.
*G01N 27/00* (2006.01)

(52) U.S. Cl. ....................... 324/557; 324/393; 324/551; 324/552

(58) Field of Classification Search .................. 324/557
See application file for complete search history.

(56) References Cited

U.S. PATENT DOCUMENTS

| | | | | |
|---|---|---|---|---|
| 5,198,394 | A * | 3/1993 | Sugimoto et al. | 501/98.5 |
| 5,254,954 | A * | 10/1993 | Fujimoto et al. | 324/551 |
| 5,565,157 | A * | 10/1996 | Sugimoto et al. | 264/101 |
| 6,239,052 | B1 * | 5/2001 | Fukushima | 501/127 |
| 6,858,975 | B1 * | 2/2005 | Matsutani | 313/143 |
| 6,909,286 | B2 * | 6/2005 | Hori | 324/401 |
| 7,557,496 | B2 * | 7/2009 | Kato | 313/143 |
| 2002/0033659 | A1 * | 3/2002 | Nishikawa et al. | 313/118 |
| 2003/0051341 | A1 * | 3/2003 | Nishikawa et al. | 29/888.01 |
| 2004/0051537 | A1 * | 3/2004 | Hori | 324/557 |

FOREIGN PATENT DOCUMENTS

| | | | |
|---|---|---|---|
| JP | 5766759 | U | 4/1982 |
| JP | 4-289681 | B2 | 10/1992 |
| JP | 4289681 | A | 10/1992 |
| JP | 2004-108817 | A | 4/2004 |
| JP | 2007-134132 | A | 5/2007 |
| JP | 2007134132 | A | 5/2007 |

* cited by examiner

*Primary Examiner*—Timothy J Dole
*Assistant Examiner*—Benjamin M Baldridge
(74) *Attorney, Agent, or Firm*—Sughrue Mion, PLLC

(57) ABSTRACT

There is provided a test method for detecting the presence or absence of a defect in a spark plug insulator, including a reference voltage determination process, a test area determination process, a test voltage determination process and a current detection process. In the reference voltage determination process, a reference voltage $V_F$ is determined. In the test area and voltage determined processes, test area and voltage are determined so as not to incur a flashover on the basis of a reference insulator of the same material, shape and size as the spark plug insulator when the reference insulator is placed in position between first and second test electrodes. In the current detection step, the test voltage is applied between the first and second test electrodes to detect an electric current between the first and second test electrodes.

9 Claims, 11 Drawing Sheets

TEST METHOD AND APPARATUS FOR SPARK PLUG INSULATOR

BACKGROUND OF THE INVENTION

The present invention relates to a method and apparatus for testing the presence or absence of a defect in a spark plug insulator.

Hereinafter, the term "front" refers to a discharge side with respect to the axial (longitudinal) direction of an insulator when assembled into a spark plug and the term "rear" refers to a side opposite to the front side.

A spark plug includes an insulator, a center electrode disposed in an axial through hole of the insulator, a metal shell disposed around an outer periphery of the insulator and a ground electrode attached to a front end of the metal shell to define a discharge gap between the center electrode and the ground electrode. By the application of a high voltage to the center electrode, a spark discharge occurs within the discharge gap between the center electrode and the ground electrode. In the presence of a defect e.g. a pin hole in the insulator, however, there is a possibility the spark discharge does not occur properly due to discharge leak through the defect in the insulator. It is thus necessary to test the presence or absence of such a defect in the insulator before the actual use of the insulator.

Japanese Patent Publication No. 2550790 proposes a method for testing the presence or absence of a defect in a ceramic insulator by placing a first test electrode in an axial through hole of the ceramic insulator and a second test electrode on an outer peripheral side of the ceramic insulator and applying a potential difference between the first and second test electrodes. It is judged that there is no defect in the ceramic insulator in the occurrence of a so-called flashover phenomenon in which a spark discharge occurs between the test electrodes and passes through the opening of the axial through hole of the ceramic insulator. On the other hand, it is judged that there is a defect in the ceramic insulator when a spark discharge occurs between the test electrodes but does not pass through the opening of the axial through hole of the ceramic insulator due to discharge leak through the defect in the ceramic insulator.

In the above proposed insulator test method, the electric discharge through the defect in the insulator is likely to occur by the application of a larger potential difference between the test electrodes. Namely, it is effective to increase the potential difference between the test electrodes for improvement in test accuracy. However, the flashover occurs when the potential difference between the test electrodes reaches or exceeds a flashover voltage. There is a limit on the test accuracy improvement that can be achieved only by increasing the potential difference between the test electrodes in the above conventional insulator test method.

Japanese Laid-Open Patent Publication No. 2004-108817 proposes to conduct a defect detection test on a ceramic insulator under high-pressure conditions in a hermetically sealed container. As the high-pressure conditions lead to an increase in flashover voltage, the potential difference between the test electrodes can be increased to a higher value for test accuracy improvement, without causing a flashover phenomenon, under the high-pressure conditions.

SUMMARY OF THE INVENTION

However, the proposed high-pressure test method requires additional major equipment such as high-pressure air supply device and pressure-resistant container and time- and labor-consuming pressure control operation to create the high-pressure conditions for the defect detection test and to recover the normal-pressure conditions for removal/replacement of the insulator after the defect detection test. This causes increase in equipment cost and deterioration in productivity.

It is therefore an object of the present invention to provide a method for testing the presence or absence of a defect in a spark plug insulator with improved accuracy and without cost increase and productivity deterioration.

According to one aspect of the present invention, there is provided a test method for a cylindrical spark plug insulator, comprising: providing a first test electrode having either a rod shape or a column shape, a second test electrode and a reference insulator formed of the same material and having the same shape and size as the spark plug insulator; determining a reference voltage to be higher than or equal to a short-circuit voltage between the first and second test electrodes when the first and second test electrodes are located apart from each other with a predetermined space left therebetween for placement of the spark plug insulator; determining a test area in which the second test electrode can be moved along an outer peripheral side of the reference insulator without the occurrence of a flashover under the application of the reference voltage between the first and second test electrodes when the first test electrode is in a position in an axial hole of the reference insulator corresponding to a given part of the spark plug insulator to be tested; determining a test voltage to be a maximum value lower than a flashover voltage of the reference insulator between the first and second test electrodes when the first test electrode is in the position in the axial hole of the reference insulator and the second test electrode is within the test area on the outer peripheral side of the reference insulator; placing the spark plug insulator between the first and second test electrodes by inserting the first test electrode in an axial hole of the spark plug insulator and arrange the second test electrode on an outer peripheral side of the spark plug insulator; after the placing, detecting an electric current between the first and second test electrodes under the application of the test voltage between the first and second test electrodes while fixing the first test electrode in position relative to the spark plug insulator and moving the second test electrode to an arbitrary position within the test area along the outer peripheral side of the spark plug insulator; and judging the presence or absence of a defect in the spark plug insulator based on the detected electric current between the first and second test electrodes.

According to another aspect of the present invention, there is provided a test apparatus for a cylindrical spark plug insulator, comprising: a first test electrode having either a rod shape or a column shape; a second test electrode; a reference insulator formed of the same material and having the same shape and size as the spark plug insulator; an ammeter capable of measuring an electric current between the first and second test electrodes; a power source capable of applying a voltage between the first and second test electrodes; and a control unit configured to: determine a reference voltage to be higher than or equal to a short-circuit voltage between the first and second test electrodes when the first and second test electrodes are located apart from each other with a predetermined space left therebetween for placement of the spark plug insulator; determine a test area in which the second test electrode can be moved along an outer peripheral side of the reference insulator without the occurrence of a flashover under the application of the reference voltage between the first and second test electrodes when the first test electrode is in a position in an axial hole of the reference insulator corresponding to a given part of the spark plug insulator to be tested; determine a test voltage to be a maximum value lower than a flashover voltage of the reference insulator between the first and second test electrodes when the first test electrode is in the position in the axial hole of the reference insulator and the second test electrode is within the test area on the outer peripheral side of the reference insulator; cause the power source to apply the test voltage between the first and second test electrodes; read the electric current between the first and second test electrodes from the ammeter under the application of the test voltage between the first and second test electrodes when the first test electrode is fixed in position in an axial hole of the spark plug insulator and the second test electrode is arranged in an arbitrary position within the test area on the outer peripheral side of the spark plug insulator; and judge the presence or absence of a defect in the spark plug insulator based on the electric current between the first and second test electrodes.

The other objects and features of the present invention will also become understood from the following description.

DESRIPTION OF THE EMBODIMENTS

Figure 1:
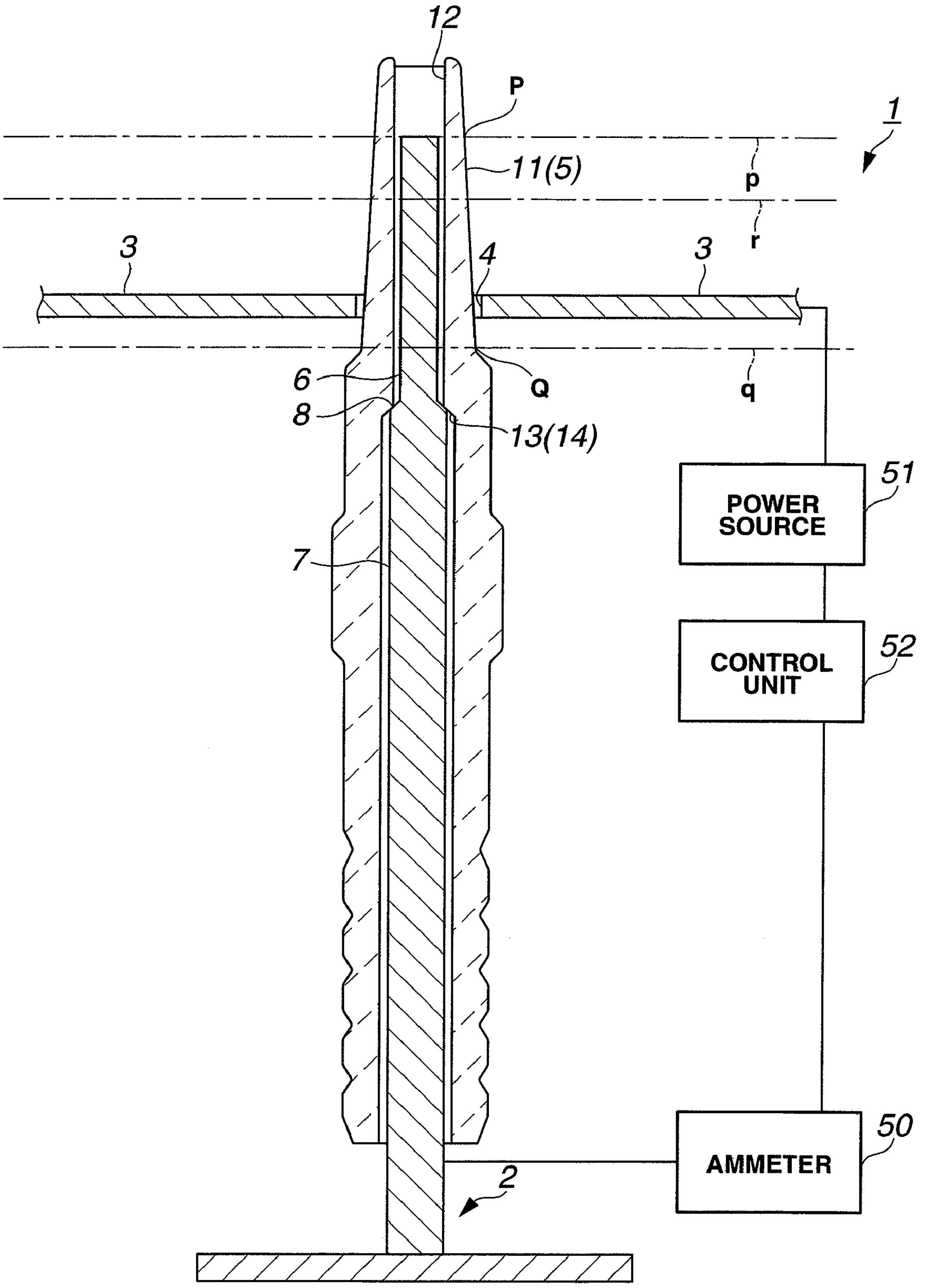
FIG. 1 is a schematic sectional view of a test apparatus for a spark plug insulator according to a first embodiment of the present invention.

The present invention will be described below by way of the following embodiments, in which like parts and portions are indicated by like reference numerals to avoid duplicated explanations thereof.

First Embodiment

The first embodiment refers to a method for testing the presence or absence of a defect in a ceramic insulator 11 by a test apparatus 1. The ceramic insulator 11 is designed, for use in a spark plug, as a cylindrical molded sintered piece of a ceramic material e.g. alumina with an axial through hole 12 as shown in FIG. 1. A stepped surface 13 is formed on the axial through hole 12 of the ceramic insulator 11 so as to retain thereon a center electrode of the spark plug. In the first embodiment, the ceramic insulator 11 has a shape that varies in thickness in the axial direction thereof and defines a contour part of the spark plug. (Hereinafter, the ceramic insulator 11 as the test sample may occasionally be referred to as the sample insulator.)

Figure 2:
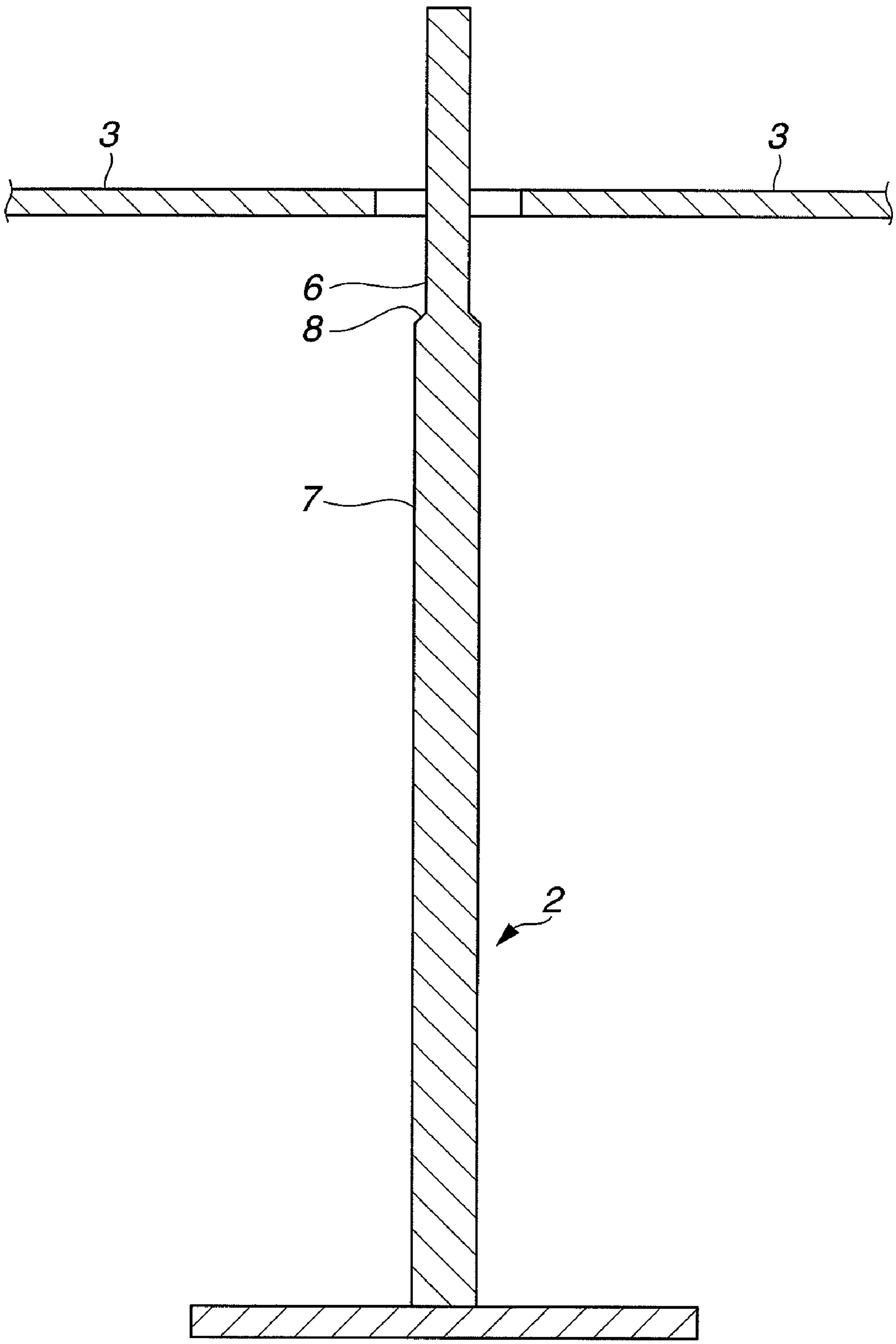
FIG. 2 is a sectional view of an electrode unit of the test apparatus according to the first embodiment of the present invention.

As shown in FIGS. 1 and 2, the test apparatus 1 includes a first test electrode 2, a second test electrode 3, a reference insulator 5, an ammeter 50, a direct-current power source 51 and a control unit 52.

The first test electrode 2 is formed of a conductive metal material in a rod or column shape. The first test electrode 2 is not necessarily uniform in diameter throughout its length as long as the first test electrode 2 can be inserted in the axial through hole 12 of the ceramic insulator 11. For example, the outer peripheral surface of the first test electrode 2 may be stepped and/or the first test electrode 2 may vary in diameter along its axial direction. In the first embodiment, the first test electrode 2 includes a small-diameter portion 6 on a front side thereof, a large-diameter portion 7 on a rear side thereof and a stepped surface 8 between the small-diameter portion 6 and the large-diameter portion 7. Further, the first test electrode 2 is connected to a ground.

The second test electrode 3 is formed of a conductive material in a plate shape. A through hole 4 is made in the second test electrode 3 at a position corresponding to the first test electrode 2 such that the first test electrode 2 can be inserted, together with the ceramic insulator 11, through the hole 4 of the second test electrode 3. The second test electrode 3 is so supported as to be movable axially along an outer peripheral side of the ceramic insulator 11.

The ammeter 50 is electrically connected to the first test electrode 2 to measure an electric current Ik between the first and second test electrodes 2 and 3.

The power source 51 is electrically connected to the second test electrode 3 to develop a potential difference between the first and second test electrodes 2 and 3.

The reference insulator 5 is formed of the same material in the same size and shape as to the sample insulator 11 and thus has an axial through hole with a stepped surface 14. Herein, the reference insulator 5 has been prepared separately from the sample insulator 11 and previously judged as a conforming product with no defect for use a reference model in the defect detection test as will be explained below.

Figure 3:
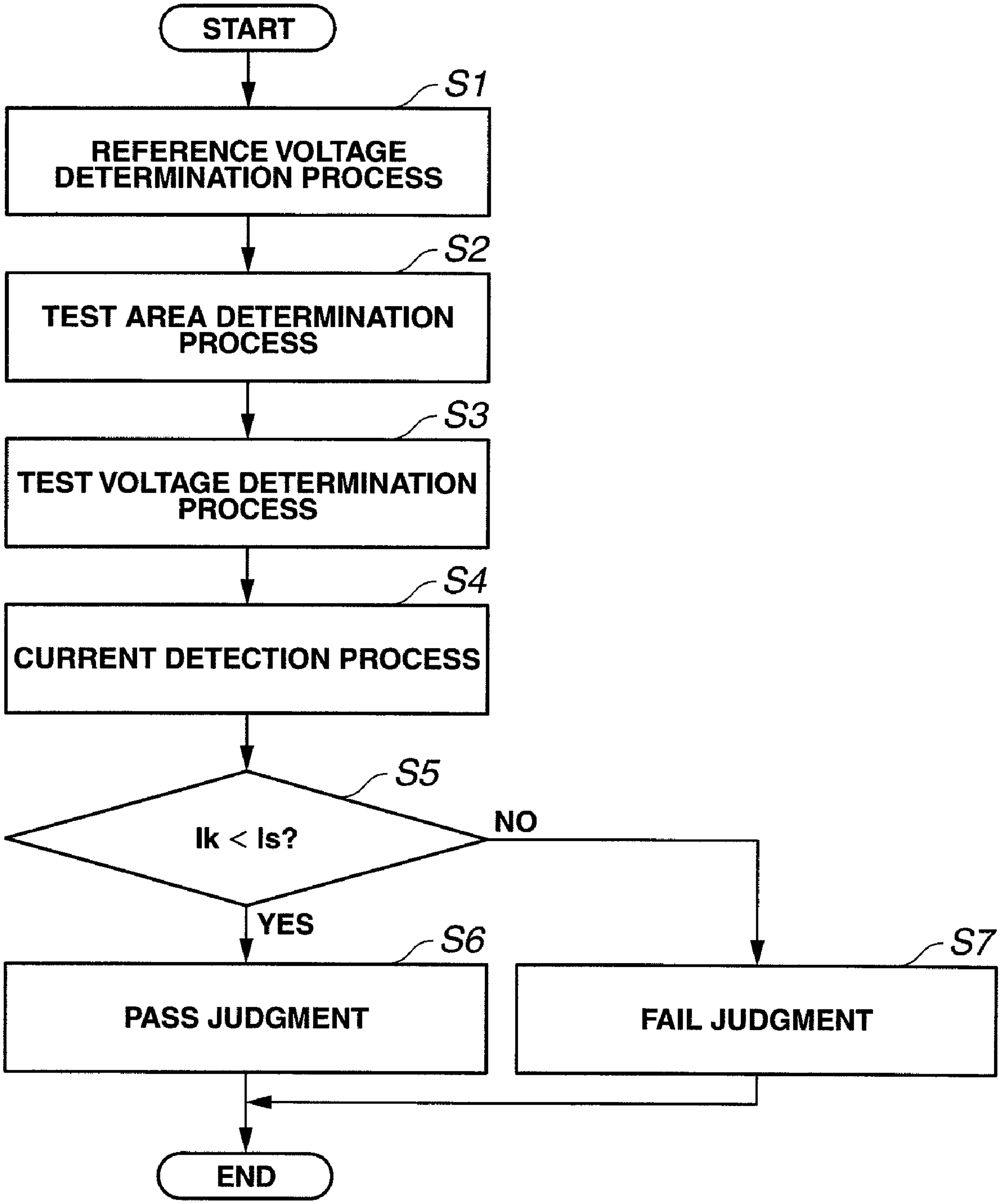
FIG. 3 is a flowchart for an insulator defect detection test program of the test apparatus according to the first embodiment of the present invention.

The control unit 52 performs a test program to conduct the defect detection test on a given part of the ceramic insulator 11 by controlling the ammeter 50 and the power source 51. In the first embodiment, the defect detection test program goes through a reference voltage determination process, a test area determination process, a test voltage determination process, a current detection process and a judgment process as shown FIG. 3.

At step S1, the reference voltage determination process is first carried out to determine a reference voltage $V_L$ (kV) to be applied to the second test electrode 3 in the subsequent test area determination process.

The reference voltage $V_L$ is determined to be equal to a so-called "short-circuit voltage" (e.g. 5 kV) at which there arises a short circuit between the first and second test electrodes 2 and 3 when the first and second test electrodes 2 and 3 are located in position to be apart from each other with a predetermined space left therebetween for placement of the sample insulator 11 (the reference insulator 5) as shown in FIG. 2. The reference voltage $V_L$ may alternatively be set to a voltage value (e.g. 10 kV) higher than the short-circuit voltage by the addition of a given margin to the short-circuit voltage.

After the reference voltage determination process and before the test area determination process, the reference insulator 5 is actually placed in position between the first and second test electrodes 2 and 3 by inserting the first test electrode 2 in the axial though hole of the reference insulator 5 to engage the stepped surfaces 8 and 14 with each other and arranging the second test electrode 3 on the outer peripheral side of the reference insulator 5 as shown in FIG. 1. With this, the first test electrode 2 is fixed in position relative to the reference insulator 5 so as to correspond to and extend over the whole of the part of the sample insulator 11 to be tested.

At step S2, the test area determination process is carried out to determine a test area in which the second test electrode 3 can be moved axially along the outer periphery of the reference insulator 5 without the occurrence of a flashover, i.e., in which the second test electrode 3 is to be moved axially along the outer periphery of the sample insulator 11 in the later current detection process. In the present description, the flashover is defined as a phenomenon in which a spark discharge occurs between the first and second test electrodes 2 and 3 and passes and leaks through the opening of the axial through hole 12 of the sample insulator 11 or the opening of the axial through hole of the reference insulator 5.

In the first embodiment, the test area is determined by monitoring the occurrence of the flashover through the application of the reference voltage $V_L$ to the second test electrode 3 while holding the first test electrode 2 in the fixed position in the axial through hole of the reference insulator 5 and moving the second test electrode 3 axially (vertically) along the outer peripheral side of the reference insulator 5 but without moving the second test electrode 3 radially (horizontally) relative to the reference insulator 5. The front and rear limits of the test area are set to points (vertical heights) immediately before the occurrence of the flashover during the front and rear movements of the second test electrode 3 under the application of the reference voltage $V_L$.

For example, it is assumed that the part of the ceramic insulator 11 between two axial positions: front position P and middle/rear position Q is to be tested. The front and rear limits of the test area is initially set to points p and q corresponding to these axial positions P and Q, respectively. The front limit of the test area is held at the point p in the case where no flashover occurs until the second test electrode 3 reaches the point p. In the case where the flashover occurs before the second test electrode 3 reaches the point p e.g. at the time the second test electrode 3 reaches a point r on the rear side of the point p, the front limit of the test area is changed to the point r. Similarly, the lower limit of the test area is held at the point q in the case where no flashover occurs until the second test electrode 3 reaches the point q.

At step S3, the test voltage determination process is carried out to determine a test voltage $V_C$ (kV) to be applied to the second test electrode 3 in the later current detection process.

The test voltage $V_C$ is determined to be a maximum value just below a so-called "flashover voltage $V_F$" of the reference insulator 5 at which there occurs a flashover occurs between the first and second test electrodes 2 and 3 when the first test electrode 2 is in the fixed position in the axial through hole of the reference insulator 5 and the second test electrode 3 is within the test area on the outer peripheral side of the reference insulator 5. The test voltage $V_C$ may be adjusted to different values depending on the position of the second electrode 3 within the test area. Namely, the test voltage $V_C$ is adjusted to a relatively high value when the reference insulator 5 and the first and second test electrodes 2 and 3 are arranged in such a positional relationship that the flashover is unlikely to occur between the first and second test electrodes 2 and 3 and adjusted to a relatively low value when the reference insulator 5 and the first and second test electrodes 2 and 3 are arranged in such a positional relationship that the flashover is likely to occur between the first and second test electrodes 2 and 3.

Figure 4:
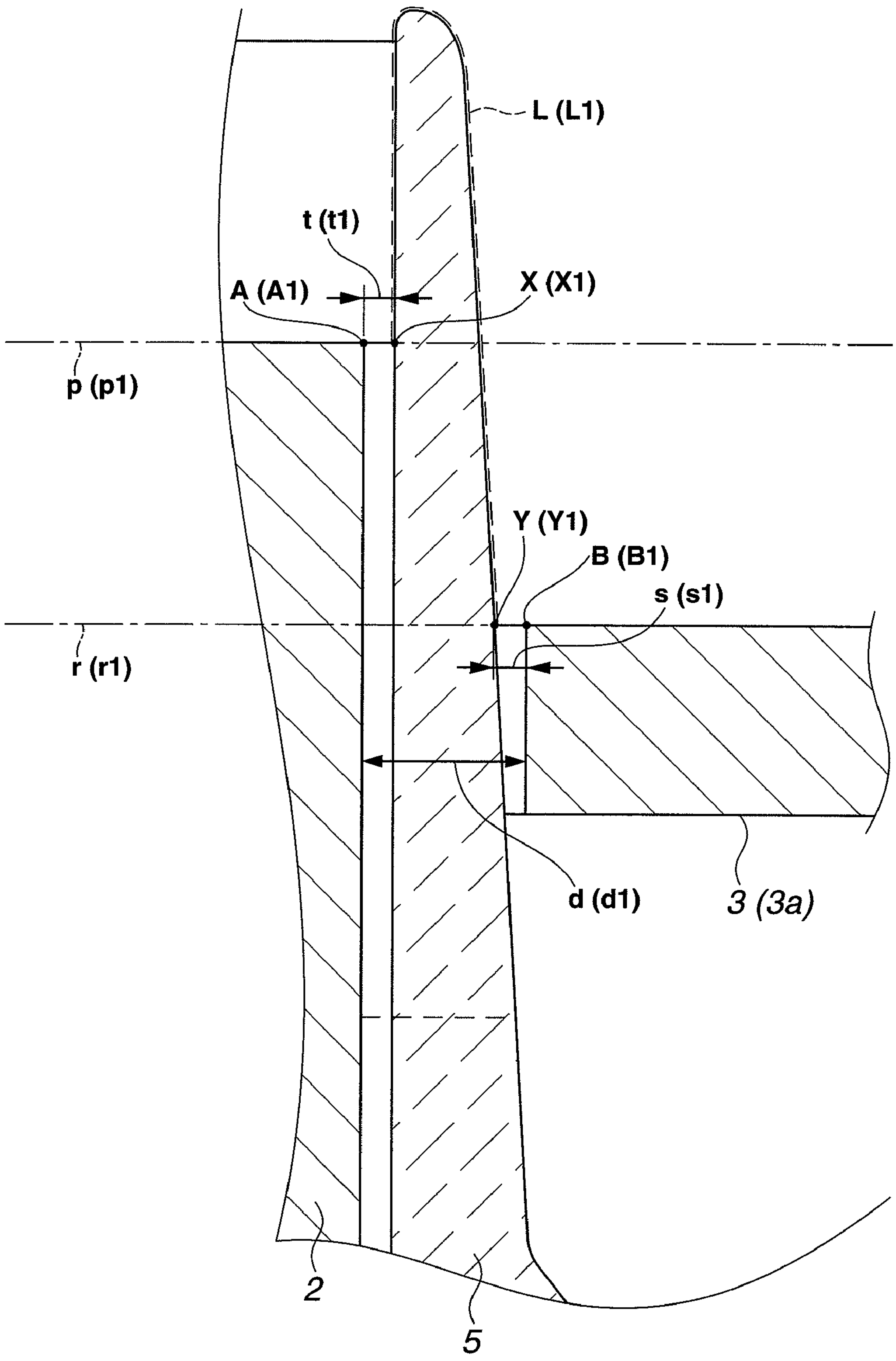
FIG. 4 is an enlarged sectional view of front part of the electrode unit of the test apparatus according to the first embodiment of the present invention.

In the first embodiment, the test voltage $V_C$ is determined to satisfy the following equation (1) with the proviso that, among possible flashover paths between the first and second test electrodes 2 and 3 along the reference insulator 5, the shortest flashover path is to pass through the front opening of the axial through hole of the reference insulator 5 as shown in FIG. 4, $$8\times(t+s)+0.4\times L>V_C\geqq 2\times d \quad (1)$$

where t (mm) is the shortest distance from the reference insulator 5 to a point A on the first test electrode 2 corresponding to one end of the shortest flashover path; s (mm) is the shortest distance from the reference insulator 5 to a point B on the second test electrode 3 corresponding the other end of the shortest flashover path; L (mm) is the shortest distance between points X and Y on the reference insulator 5 located at the distances t and s from the points A and B on the first and second test electrodes 2 and 3; and d (mm) is the shortest distance between the first and second test electrodes 2 and 3.

In the equation (1), the term (8×t) provides a voltage (potential difference) required for the flow of electric current through the air between the point A on the first test electrode 2 and the point X on the reference insulator 5 due to an electrical breakdown of the air. The term (8×s) provides a voltage (potential difference) required for the flow of electric current through the air between the point B on the second test electrode 3 and the point Y on the reference insulator 5 due to an electrical breakdown of the air. The term (0.4×L) provides a voltage (potential difference) required for the flow of electric current between the points X and Y along the surface of the reference insulator 5. In other words, the term {8×(t+s)+0.4×L} provides a voltage (potential difference) required for the flow of electric current between the first and second test electrodes 2 and 3 along the surface of the reference insulator S and thus corresponds to the flashover voltage $V_F$. It means that the test voltage $V_C$ is set lower than the flashover voltage $V_F$ when $\{8\times(t+s)+0.4\times L\}>V_C$. Further, the average field intensity between the first and second test electrodes 2 and 3 is given by division of the test voltage $V_C$ by the distance d between the first and second test electrodes 2 and 3. It means that the average field intensity between the first and second test electrodes 2 and 3 is higher than or equal to 2 kV/mm when $V_C\geqq 2\times d$. The distance between the first and second test electrodes 2 and 3 is herein desirably minimized to achieve a higher field intensity between the first and second test electrodes 2 and 3.

It is now assumed that the front and rear limits of the test area are set to the points r and q, respectively. In this case, the flashover path between the first and second test electrodes 2 and 3 along the reference insulator 5 is shortest when the second test electrode 3 is in the front limit point r. The test voltage $V_C$ is thus set to the maximum value below the flashover voltage $V_F$ so as to satisfy the relationship of $\{8\times(t+s)+0.4\times L\}>V_C$ where the second test electrode 3 is in the front limit point r. Further, the first and second test electrodes 2 and 3 are held as closely as possible to each other so as to satisfy the relationship of $V_C \geqq 2 \times d$.

In this way, it becomes possible to set the test voltage $V_C$ to a higher value, so as to increase the field intensity between the first and second test electrodes 2 and 3 without causing the flashover, and thereby enhance the ease of detection of the defect in the ceramic insulator 11 for further improvements in test accuracy by satisfaction of the above equation (1).

After the test voltage determination process and before the current detection process, the reference insulator 5 is removed from the test apparatus 1. The sample insulator 11 is then placed in position between the first and second test electrodes 2 and 3 by inserting the first test electrode 2 in the axial through hole 12 of the sample insulator 11 engage the stepped surfaces 8 and 13 with each other and arranging the second test electrode 3 on the outer peripheral side of the sample insulator 11 as shown in FIG. 1. With this, the first test electrode 2 is fixed in position relative to the sample insulator 11 so as to correspond to and extend over the whole of the part of the sample insulator 11 to be tested.

At step S4, the current detection process is carried out to cause the power source 51 to apply the test voltage $V_C$ to the second test electrode 3 and read the current Ik between the first and second test electrodes 2 through the ammeter 50 under the application of the test voltage $V_C$ to the second test electrode 3 while holding the first test electrode 2 in the fixed position in the axial through hole 12 of the ceramic insulator 11 and moving the second test electrode 3 within the test area along the outer peripheral side of the ceramic insulator 11.

At step S5, the judgment process is proceeded to compare the current Ik with a given current threshold value Is and decide whether the current Ik is smaller than the threshold value Is. In the absence of the defect (e.g. pin hole) in the ceramic insulator 11, no flashover occurs between the first and second test electrodes 2 and 3 so that the current Ik between the first and second test electrodes 2 and 3 is smaller than the threshold value Is. When $Ik < Is$, the program goes to step S6. In the presence of the defect in the ceramic insulator 11, the spark discharge occurs and passes through the defect in the ceramic insulator 11 so that the current Ik becomes larger than or equal to the threshold value Is. The program goes to step S7 when $Ik \geqq Is$.

At step S6, the ceramic insulator 11 is judged as a conforming product with no defect.

At step S7, the ceramic insulator 11 is judged as a failing product with some defect.

As explained above, the test voltage $V_C$ is set to the maximum value just below the flashover voltage $V_F$ so as to enhance the degree of occurrence of electric discharge through the defect in the ceramic insulator 11 but to prevent the occurrence of the flashover phenomenon during the application of the test voltage $V_C$. The test apparatus 1 does not require additional major equipment and time- and labor-consuming control operations. It is therefore possible to detect even the small defect in the ceramic insulator 11 with improved accuracy and without cost increase and productivity deterioration.

Second Embodiment

Figure 5:
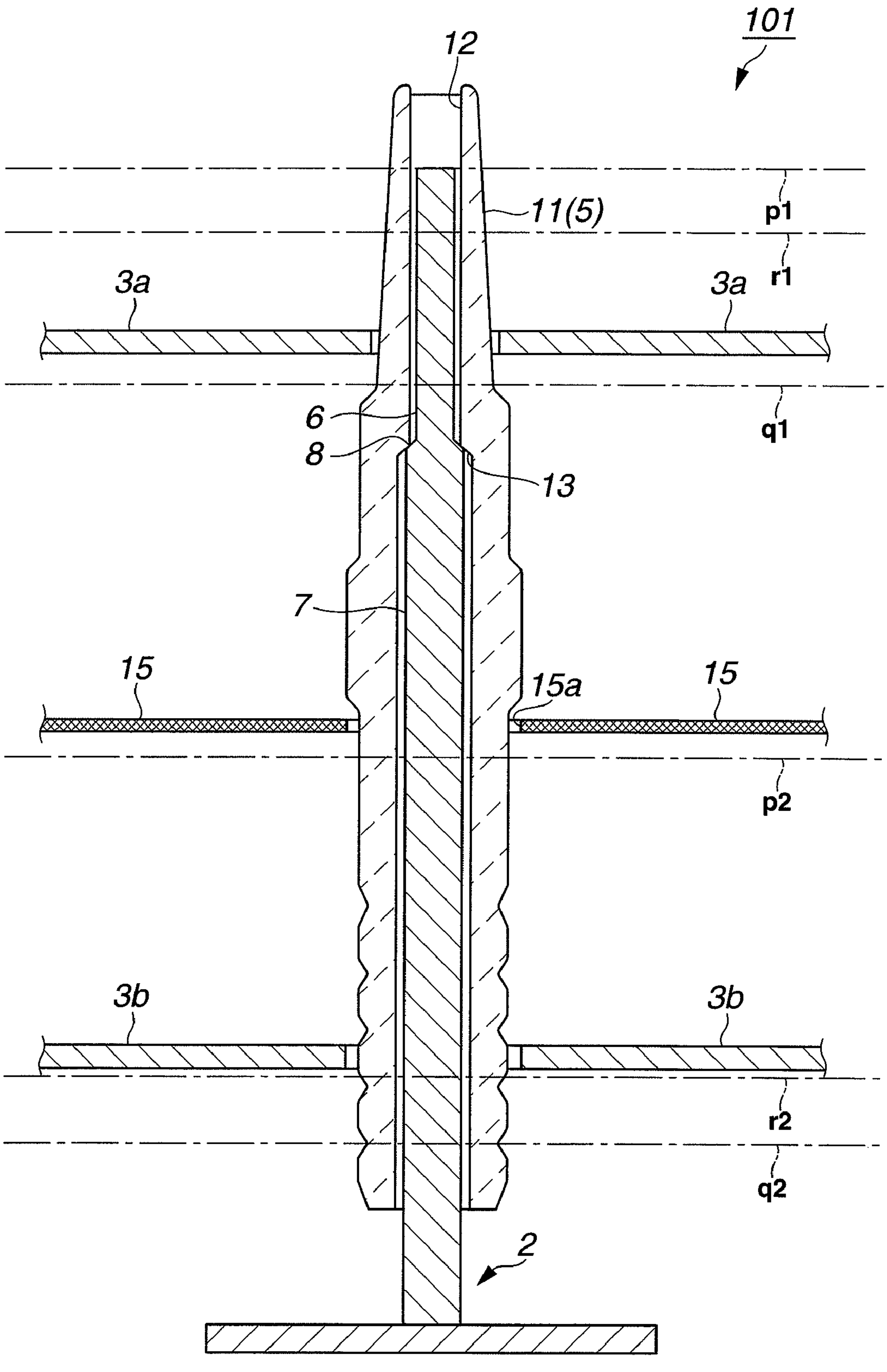
FIG. 5 is a schematic sectional view of a test apparatus for a spark plug insulator according to a second embodiment of the present invention.
Figure 6:
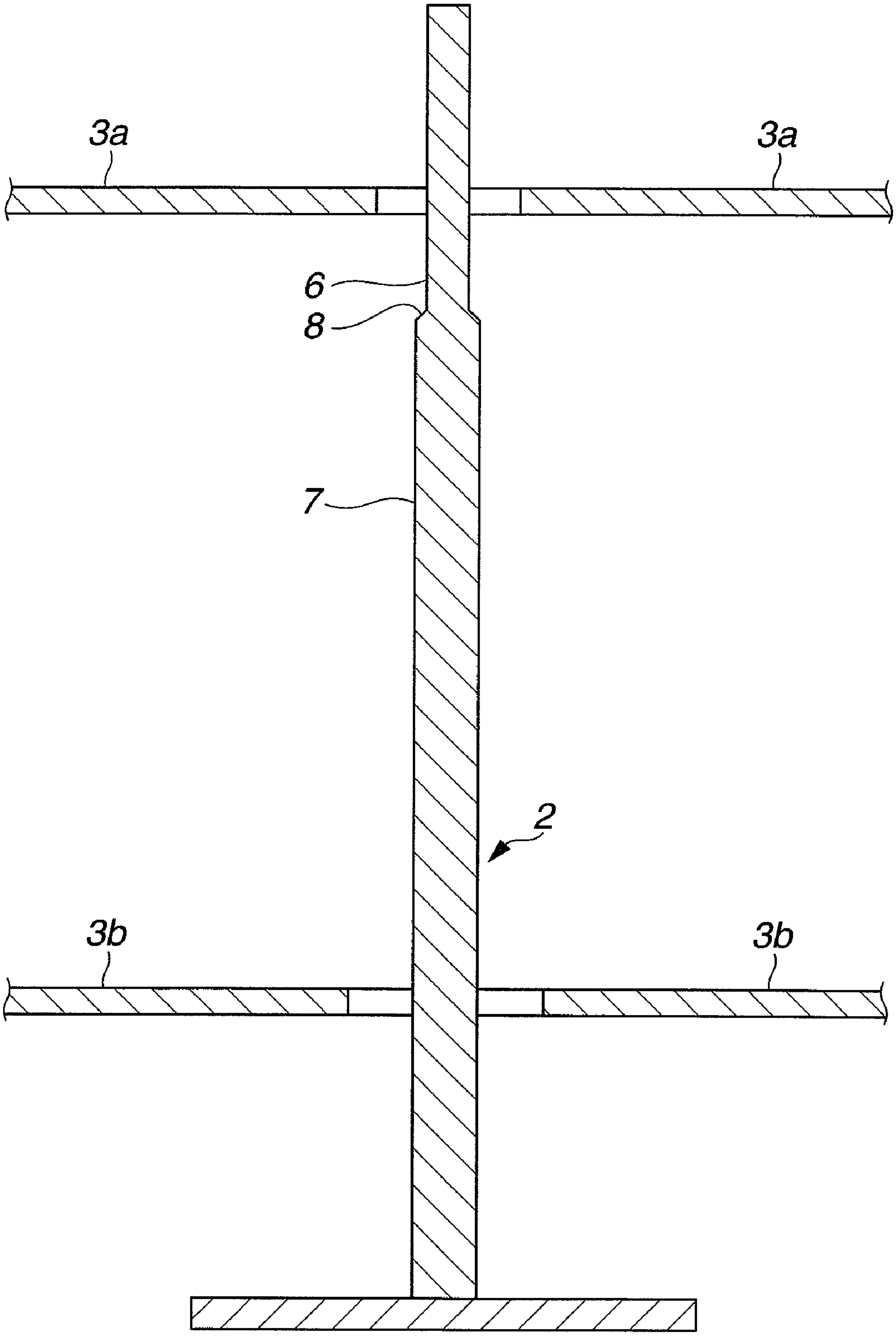
FIG. 6 is a sectional view of an electrode unit of the test apparatus according to the second embodiment of the present invention.

The second embodiment is similar to the first embodiment, except that a test apparatus 101 of the second embodiment is capable of simultaneous defect detection tests on a plurality of ceramic insulators 11 at a plurality of points. For simplification purposes, one ceramic insulator 11 is illustrated in FIGS. 5 and 6. Although the test apparatus 101 has an ammeter 50, a direct-current power source 51 and a control unit 52 as in the case of the first embodiment, these structural components 50, 51 and 52 are omitted from FIGS. 5 and 6 for simplification purposes.

As shown in FIG. 5, the test apparatus 101 includes a net-shaped holder 15 with openings 15*a* so that the ceramic insulators 11 can be held in the respective openings 15*a* of the holder 15 and carried at once by movement of the holder 15. The holder 15 is supported by an insulating support member and kept from electrical contact with the ceramic insulators 11 so as not to produce an electrical effect on the ceramic insulators 11 during the defect detection test.

The test apparatus 101 further includes a plurality of e.g. two second test electrodes 3*a* and 3*b* on one ceramic insulator 11. These two second test electrodes 3*a* and 3*b* are located on front and rear sides of the holder 15 and thus axially apart from each other and correspond to the front and rear parts of the ceramic insulator 11, respectively, as shown in FIGS. 5 and 6.

In the second embodiment, the defect detection test program takes place on each ceramic insulator 11 as follows in the same manner as in the first embodiment.

The reference voltage determination process is first carried out to determine reference voltages $V_{L1}$ and $V_{L2}$ for the second test electrodes 3*a* and 3*b*.

The reference voltages $V_{L1}$ and $V_{L2}$ are determined to be equal to or higher than the short-circuit voltages between the first and second test electrodes 2 and 3*a* and between the first and second test electrodes 2 and 3*b*, respectively, when the first and second test electrodes 2, 3*a* and 3*b* are located apart from each other in such a manner as to leave a predetermined space for placement of the sample insulator 11 (the reference insulator 5) between the first and second test electrodes 2 and 3*a* and between the first and second test electrodes 2 and 3*b*. In the second embodiment, the insulator placement space between the first test electrode 2 and the second test electrode 3*a* is wider than the insulator placement space between the first test electrode 2 and the second test electrode 3*b* as shown in FIGS. 5 and 6 so that the reference voltages $V_{L1}$ for the second test electrode 3*a* is smaller than the reference voltage $V_{L2}$ for the second test electrode 3*b*.

Next, the test area determination process is carried out to determine test areas for the second test electrodes 3*a* and 3*b* by, while holding the first test electrode 2 in the fixed position in the axial through hole of the reference insulator 5, moving the second test electrode 3*a* between vertical positions p1 and q1 along the outer peripheral side of the reference insulator 5 through the application of the reference voltage $V_{L1}$ to the second test electrode 3*a* and moving the second test electrode 3*b* between vertical position p2 and q2 along the outer peripheral side of the reference insulator 5 through the application of the reference voltage $V_{L2}$ to the second test electrode 3*b*.

More specifically, the front and rear limits of the test area for the second test electrode 3*a* are initially set to the points p1 and q1. The front limit of the test area for the second test electrode 3*a* is held at the point p1 in the case where no flashover occurs until the second test electrode 3*a* reaches the point p1 and, in the case where the flashover occurs at the time the second test electrode 3*a* reaches a vertical point r1 before the point p1, changed to the point r1. The lower limit of the test area for the second test electrode 3*b* is held at the point q1 in the case where no flashover occurs until the second test electrode 3*b* reaches the point q1. Similarly, the front and rear limits of the test area for the second test electrode 3*b* are initially set to the points p2 and q2. The front limit of the test area for the second test electrode 3*b* is held at the point p2 in the case where no flashover occurs until the second test electrode 3*b* reaches the point p2. The lower limit of the test area for the second test electrode 3*b* is held at the point q2 in the case where no flashover occurs until the second test electrode 3*b* reaches the point q2 and, in the case where the flashover occurs at the time the second test electrode 3*b* reaches a vertical point r2 before the point q2, changed to the point r2

The test voltage determination process is subsequently carried out to determine test voltages $V_{C1}$ and $V_{C2}$ for the second test electrodes 3*a* and 3*b*.

In the first embodiment, the test voltage $V_{C1}$ for the second test electrode 3*a* is determined to be a maximum value just below the flashover voltage between the first and second test electrodes 2 and 3*a* on the reference insulator 5 and, more specifically, to satisfy the following equation (2)-1 with respect to the shortest flashover path between the first and second test electrodes 2 and 3*a* along the surface of the reference insulator 5 through the front opening of the axial through hole of the reference insulator 5 as shown in FIG. 4:

$$8\times(t1+s1)+0.4\times L1>V_{C1} \quad (2)\text{-}1$$

where t1 (mm) is the shortest distance from the reference insulator 5 to a point A1 on the first test electrode 2 corresponding to one end of the shortest flashover path; s1 (mm) is the shortest distance from the reference insulator 5 to a point B1 on the second test electrode 3*a* corresponding the other end of the shortest flashover path; L1 (mm) is the shortest distance between points X1 and Y1 on the reference insulator 5 located at the distances t1 and s1 from the points A1 and B1 on the first and second test electrodes 2 and 3*a*; and d1 (mm) is the shortest distance between the first and second test electrodes 2 and 3*a*. When the front and rear limits of the test area of the second test electrode 3*a* are set to the points r1 and q1, the test voltage $V_{C1}$ is set to the maximum value below the value of {8×(t1+s1)+0.4×L1} where the second test electrode 3*a* is in the front limit point r1.

Figure 7:
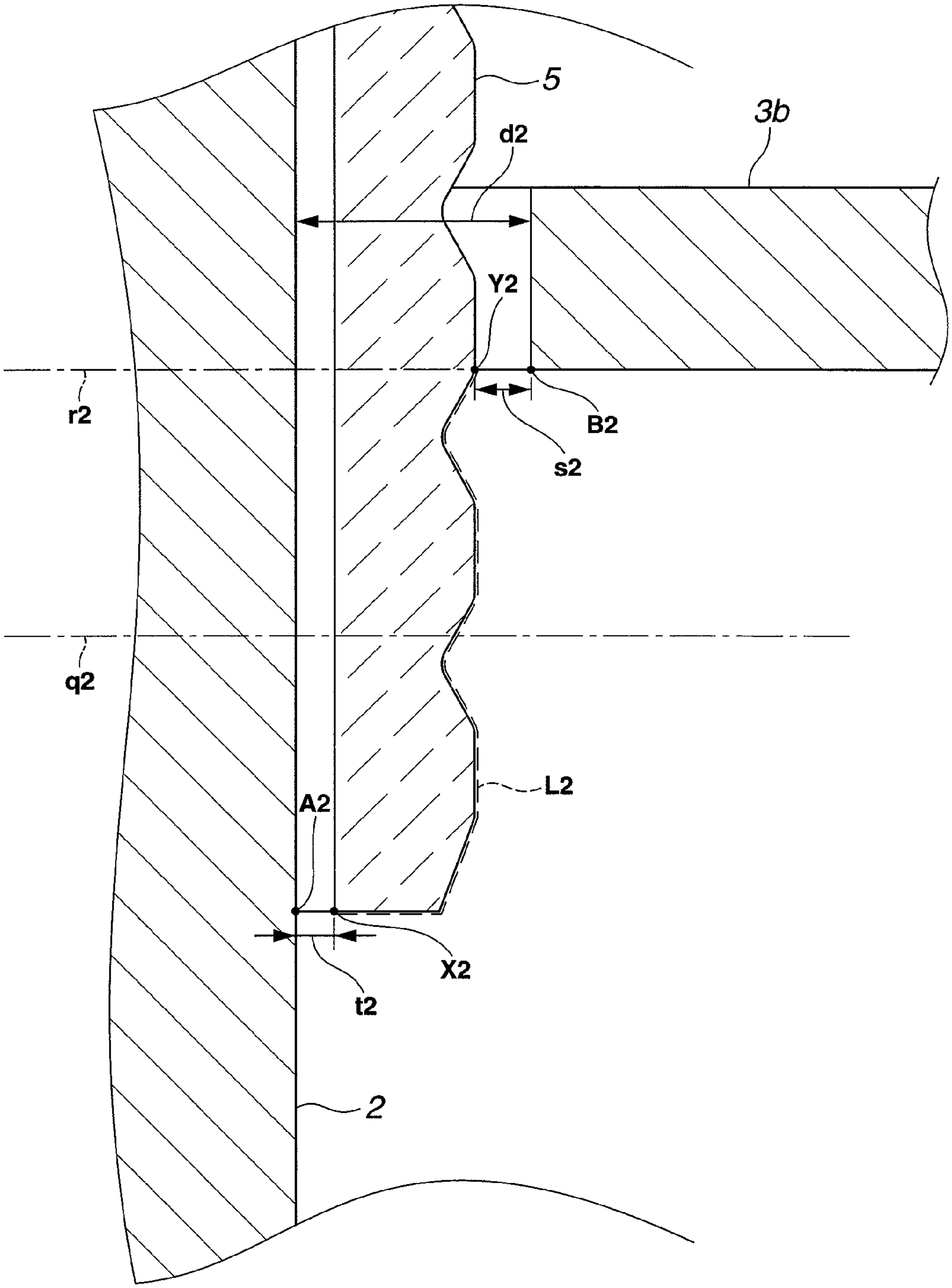
FIG. 7 is an enlarged sectional view of rear part of the electrode unit of the test apparatus according to the second embodiment of the present invention.

The test voltage $V_{C2}$ for the second test electrode 3*b* is determined to be a maximum value just below the flashover voltage between the first and second test electrodes 2 and 3*b* on the reference insulator 5 and, more specifically, to satisfy the following equation (2)-2 with respect to the shortest flashover path between the first and second test electrodes 2 and 3*b* along the surface of the reference insulator 5 through the rear opening of the axial through hole of the reference insulator 5 as shown in FIG. 7:

$$8\times(t2+s2)+0.4\times L2>V_{C2} \quad (2)\text{-}2$$

where t2 (mm) is the shortest distance from the reference insulator 5 to a point A2 on the first test electrode 2 corresponding to one end of the shortest flashover path; s1 (mm) is the shortest distance from the reference insulator 5 to a point B2 on the second test electrode 3*b* corresponding the other end of the shortest flashover path; L2 (mm) is the shortest distance between points X2 and Y2 on the reference insulator 5 located at the distances t2 and s2 from the points A2 and B2 on the first and second test electrodes 2 and 3*b*; and d2 (mm) is the shortest distance between the first and second test electrodes 2 and 3*b*. When the front and rear limits of the test area of the second test electrode 3*b* are set to the points p2 and r2, the test voltage $V_{C2}$ is set to the maximum value below the value of {8×(t2+s2)+0.4×L2} where the second test electrode 3*b* is in the rear limit point r2.

The current detection process is then carried out to detect the electric currents between the first and second test electrodes 2 and 3*a* and between the first and second test electrodes 2 and 3*b* through the application of the test voltages $V_{C1}$ and $V_{C2}$ while holding the first test electrode 2 in the fixed position in the axial through hole 12 of the ceramic insulator 11 and arranging the second test electrodes 3*a* and 3*b* in arbitrary positions within the respective test areas on the outer peripheral side of the ceramic insulator 11. In this current detection process, the voltage (potential difference) between the second test electrodes 3*a* and 3*b* is relatively smaller than the voltages (potential differences) between the first and second test electrodes 2 and 3*a* and between the first and second test electrodes 2 and 3*b*. There will be no trouble during the defect detection test as long as the second test electrodes 3*a* and 3*b* are located apart from each other by a certain distance or more.

Finally, the judgment process is carried out to make a pass or fail judgment to judge the ceramic insulator 11 as either a conforming product with no defect or a failing product with some defect based on the current detection results.

It is therefore possible in the second embodiment to obtain the same effects as in the first embodiment. It is additionally possible in the second embodiment to test the ceramic insulators 11 at a plurality of points simultaneously and shorten the defect detection test time for further improvements in productivity.

Third Embodiment

Figure 8:
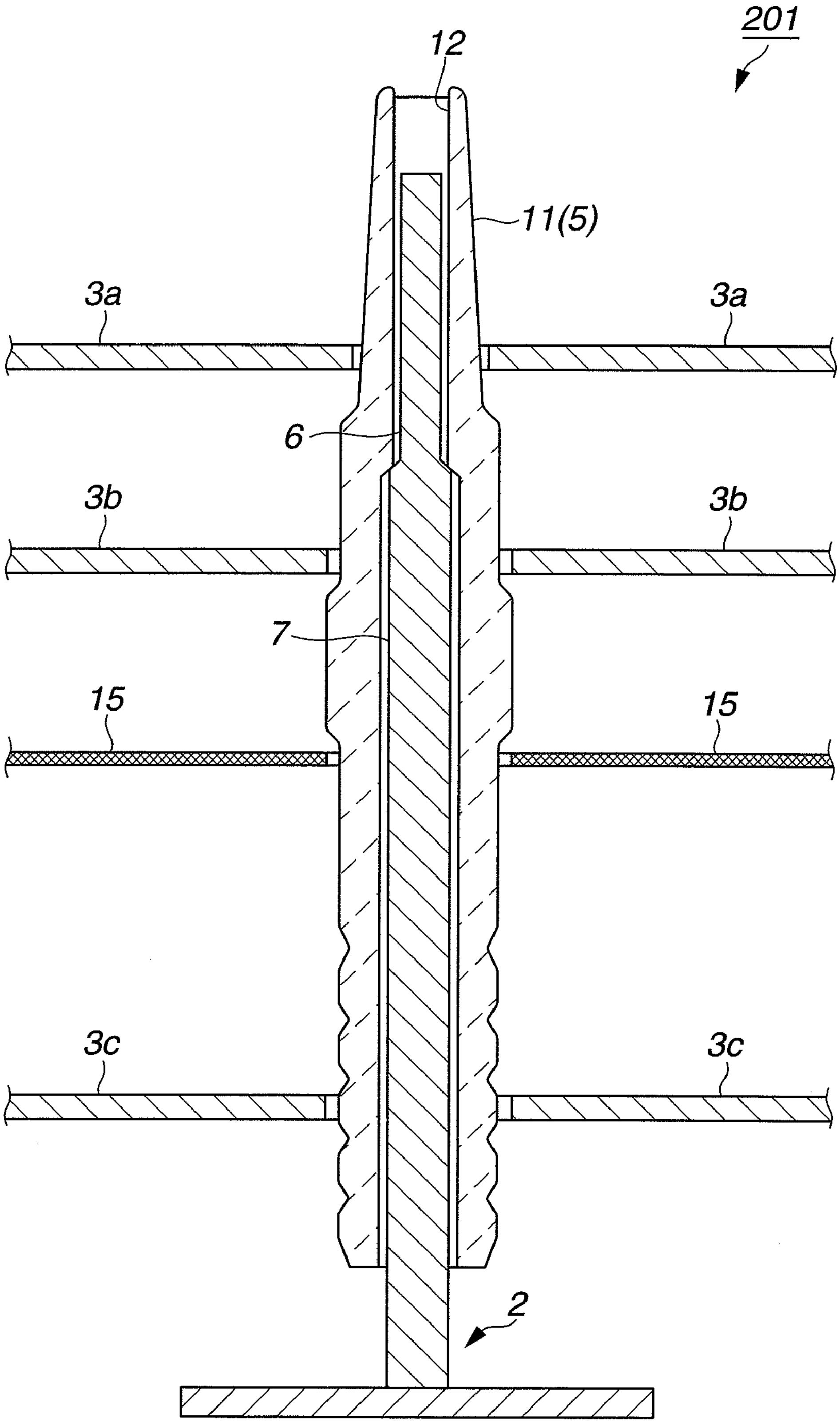
FIG. 8 is a schematic sectional view of a test apparatus for a spark plug insulator according to a third embodiment of the present invention.

The third embodiment is similar to the second embodiment, except that a test apparatus 201 of the third embodiment has a different number of second test electrodes and carries out a test voltage determination process in a different manner. In FIG. 8, one ceramic insulator 11 is illustrated for simplification purposes. Although the test apparatus 201 has an ammeter 50, a direct-current power source 51 and a control unit 52 as in the case of the first and second embodiments, these structural components 50, 51 and 52 are omitted from FIG. 8 for simplification purposes.

As shown in FIG. 8, the test apparatus 201 has three second test electrodes 3*a*, 3*b* and 3*c*: two second test electrodes 3*a* and 3*b* on the front side of the holder 15 and one second test electrode 3*c* on the rear side of the holder 15.

In the third embodiment, the defect detection test program takes place in the same manner as in the first and second embodiments, except for the test voltage determination process. Each of the reference voltage determination process, the test area determination process and the current detection process is carried out in a state where all of the second test electrodes 3*a*, 3*b* and 3*c* are placed in position, so as to determine the reference voltages $V_{L1}$, $V_{L2}$ and $V_{L3}$ and test areas for the second test electrodes 3*a*, 3*b* and 3*c* and apply the test voltages $V_{C1}$, $V_{C2}$ and $V_{C3}$ to the second test electrodes 3*a*, 3*b* and 3*c* simultaneously. On the other hand, the test voltage determination process is carried out in a state where only one of the second test electrodes 3*a*, 3*b* and 3*c* is placed in position within the corresponding test area and the other two of the second test electrodes 3*a*, 3*b* and 3*c* are removed, so as to determine the test voltages $V_{C1}$, $V_{C2}$ and $V_{C3}$ individually one by one.

It is therefore possible in the third embodiment to obtain the same effects as in the first and second embodiments. It is additionally possible to determine the test voltages $V_{C1}$, $V_{C2}$ and $V_{C3}$ more properly for the second test electrodes 3*a*, 3*b* and 3*c* and test the ceramic insulator 11 at a plurality of points simultaneously without decrease in test accuracy.

Modifications

Figure 9:
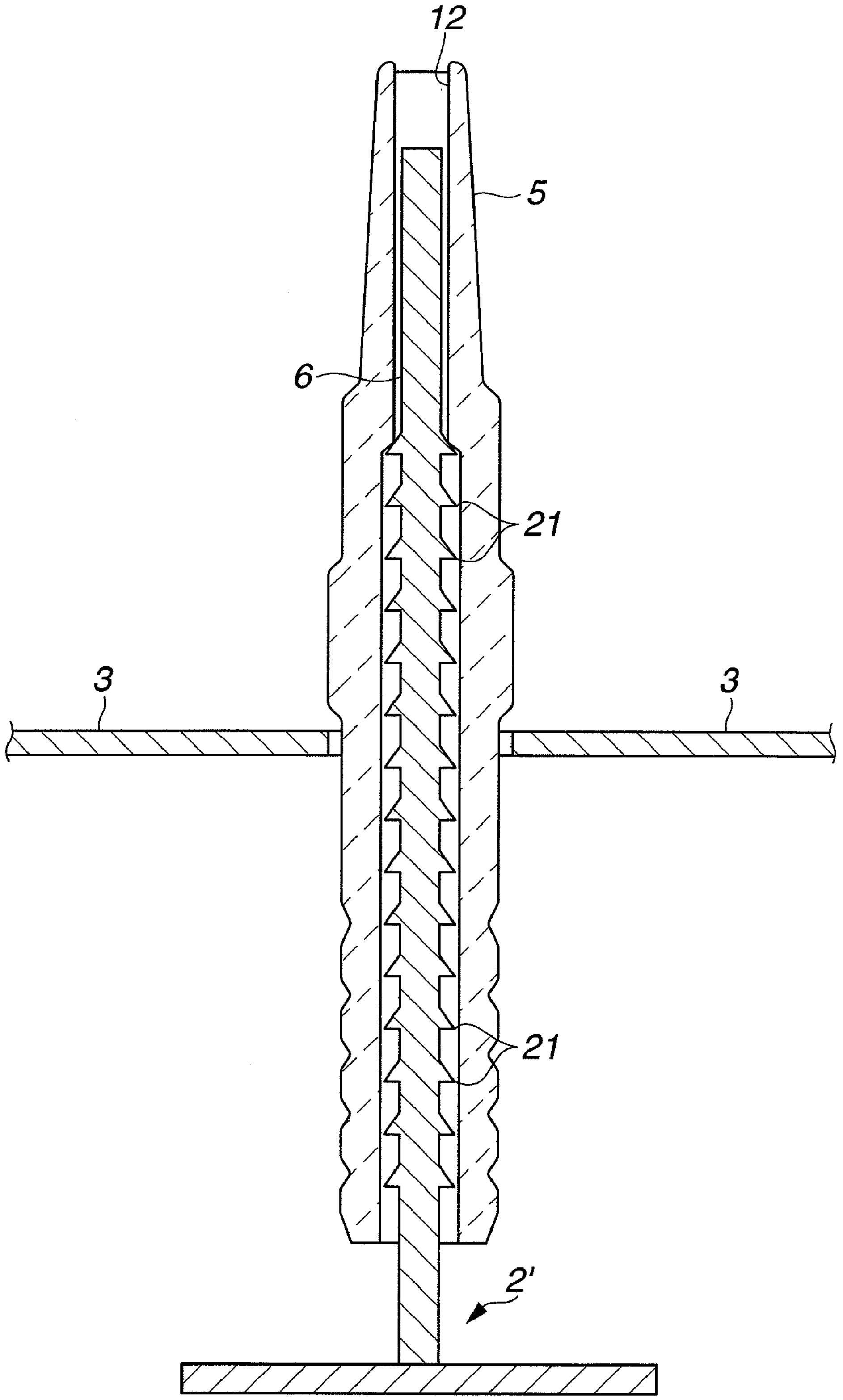
FIG. 9 is a schematic sectional view of a test apparatus for a spark plug insulator according to a fourth embodiment of the present invention.
Figure 10:
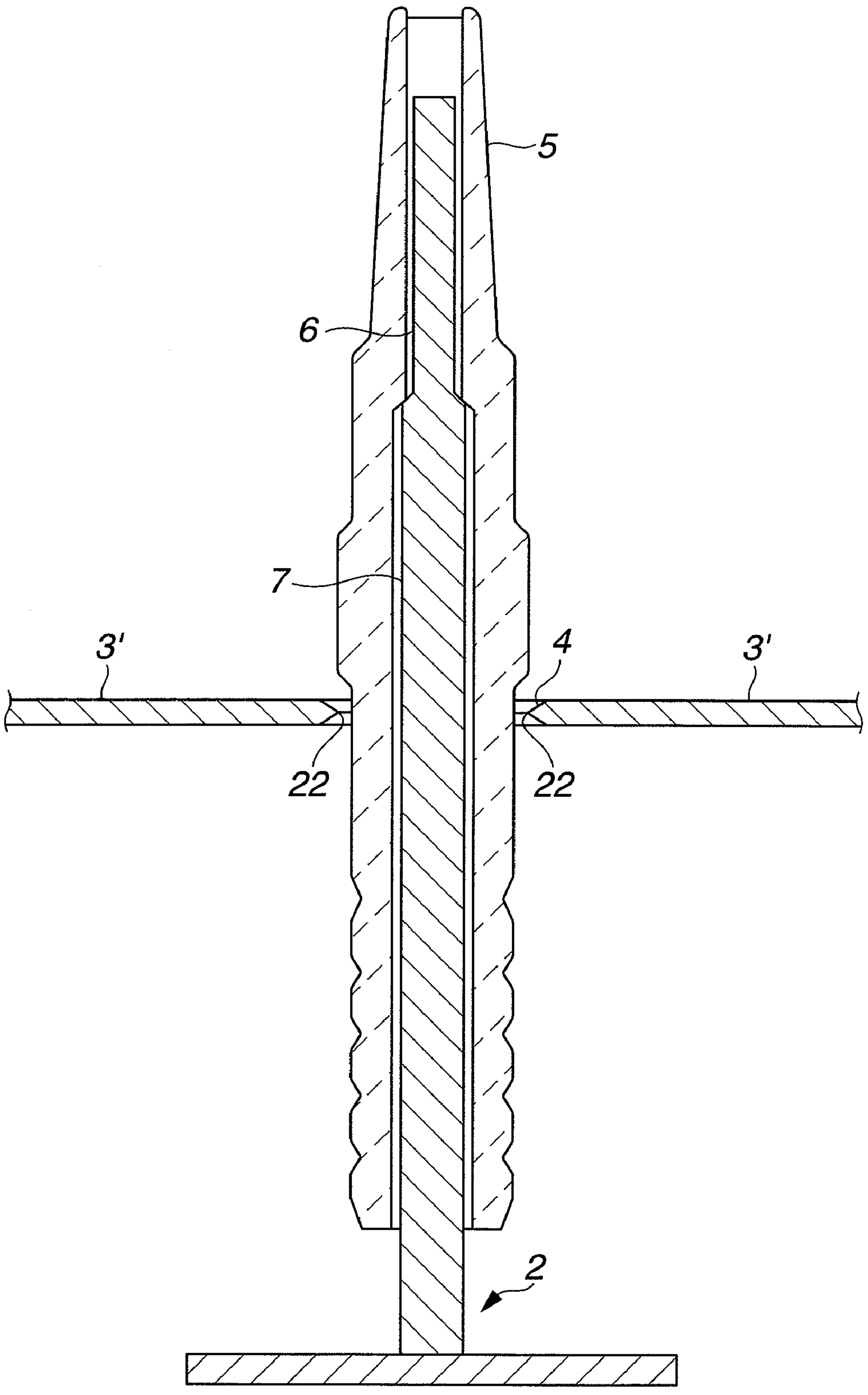
FIG. 10 is a schematic sectional view of a test apparatus for a spark plug insulator according to a fifth embodiment of the present invention

Although the outer peripheral surface of the first test electrode 2 is smooth in the first embodiment, one or more protrusions may be formed on the outer peripheral surface of the first test electrode 2. One or more protrusions may also be formed on the inner peripheral surface of the through hole 4 of the second test electrode 3 although the inner peripheral surface of the through hole 4 of the second test electrode 3 is smooth in the first embodiment. For example, there can be used a first test electrode 2' having at least one protrusion e.g. a plurality of protrusions 21 protruding through the outer peripheral surface thereof toward the second test electrode 3 as shown in FIG. 9. There is no particular restriction on the form of the protrusions 21. The protrusions 21 may be in e.g. peripheral flange form or knurl form. There can be used a second test electrode 3' having at least one protrusion 22 protruding through the inner peripheral surface of the through hole 4 toward the first test electrode 2 as shown in FIG. 10. There is no particular restriction on the form of the protrusion 22. Both of the protrusions 21 and 22 may be formed on the respective test electrodes 2' and 3'. By the formation of such protrusions 21 and 22, it is possible to attain a higher field intensity at the surface of the ceramic insulator 11 for improvements in test accuracy. It is preferable that the protrusion 21, 22 is edged in e.g. taper form for increase in electric flux line density. It is also preferable that the protrusion 21, 22 has a protrusion amount of 0.1 mm or more. The same goes for the second and third embodiments.

Although the test voltage $V_C$ ($V_{C1}$, $V_{C2}$, $V_{C3}$) is set higher than or equal to 2$d$ (kV) so as to attain an average field intensity of 2 kV/mm or higher between the first and second test electrodes 2 and 3 (3$a$, 3$b$, 3$c$) in the first to third embodiments, the test voltage $V_C$ ($V_{C1}$, $V_{C2}$, $V_{C3}$) may alternatively be set to be able to attain a field intensity of 5 kV/mm or higher at the surface of the ceramic insulator 11 so as to facilitate detection of the defect in the ceramic insulator 11 more effectively for further improvements in test accuracy.

Figure 11:
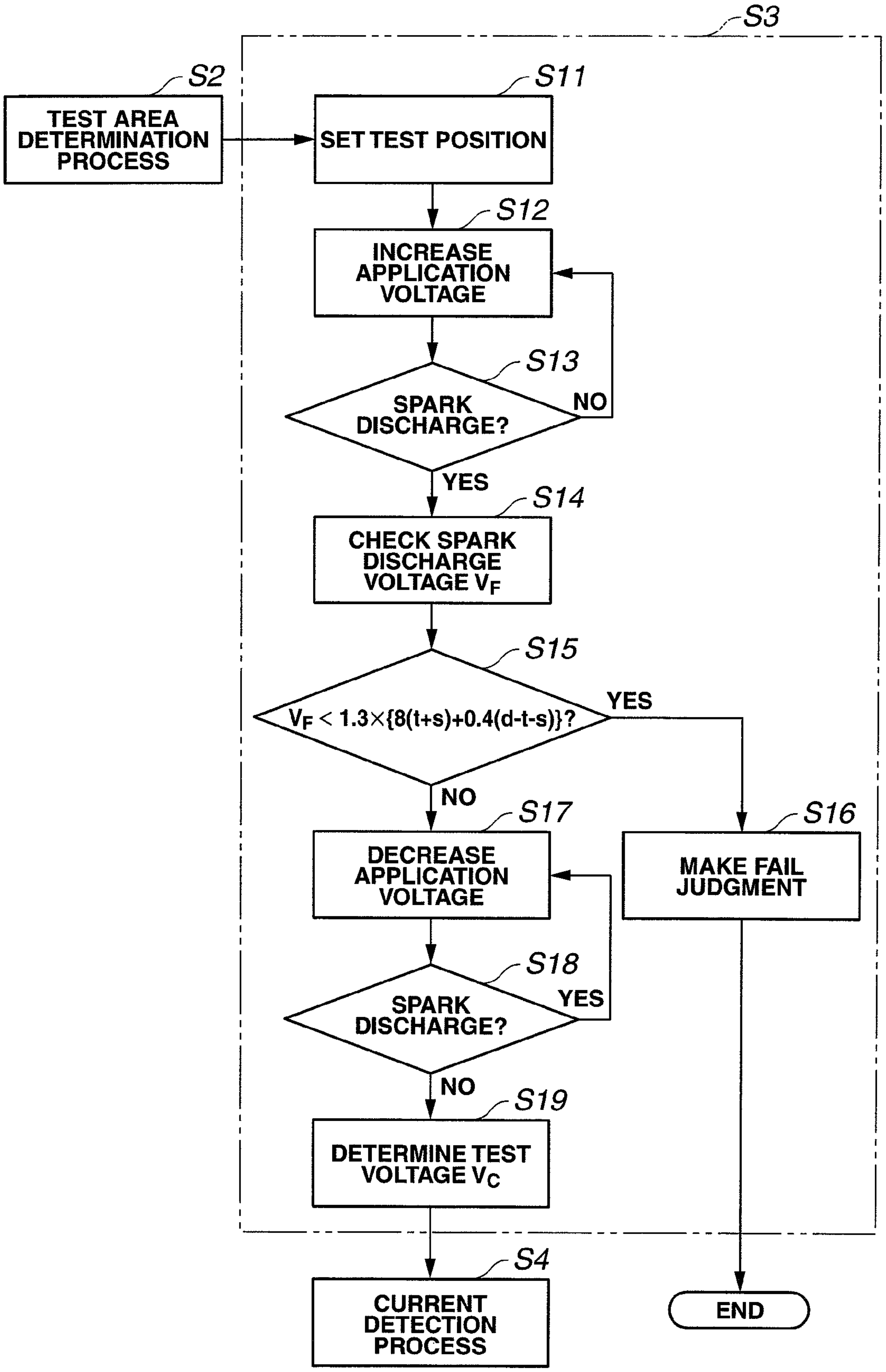
FIG. 11 is a flowchart for a test voltage determination process of an insulator defect detection test program according to a sixth embodiment of the present invention.

In the first to third embodiments, the reference insulator 5 has previously been approved as a conforming product with no defect. The reference insulator 5 may alternatively be tested for the presence or absence of a defect during the test voltage determination process as follows as shown in FIG. 11.

At step S11, the second test electrode 3 is arranged in any arbitrary position within the test area on the outer peripheral side of the reference insulator 5 whereas the first test electrode 2 is fixed in position in the axial through hole of the reference insulator 5.

At step S12, the voltage to the second test electrode 3 is gradually increased.

At step S13, the occurrence or non-occurrence of a spark discharge between the first and second test electrodes 2 and 3 is monitored. In the occurrence of the spark discharge, the program goes to step S14. The program goes back to step S12 in the non-occurrence of the spark discharge.

At step S14, the voltage between the first and second test electrodes 2 and 3 at the occurrence of the spark discharge is checked and determined as a spark discharge voltage $V_F$.

At step S15, it is examined whether the spark discharge voltage $V_F$ satisfies the following equation (3) with respect to the shortest path between the first and second test electrodes 2 and 3 along the reference insulator 5:

$$V_F<1.3\times\{8\times(t+s)+0.4\times(d-t-s)\} \qquad (3)$$

where t, s and d are the same as those of the equation (1).

In the equation (3), the term {8×(t+s)} provides a voltage required for the flow of electric current through the air between the first test electrode 2 and the reference insulator 5 and between the second test electrode 3 and the reference insulator 5 due to an electrical breakdown of the air as in the case of the equation (1). The term (d−t−s) provides a thickness of the reference insulator 5 between the first and second test electrodes 2 and 3. In the presence of a defect e.g. a pin hole in the reference insulator 5, the length of the defect is at least (d−t−s). In other words, the term {0.4×(d−t−s)} provides a minimum voltage required for the flow of electric current through the defect in the reference insulator 5. It means that there is a possibility of electric discharge passing through the defect in the reference insulator 5 through the application of the voltage of {8×(t+s)+0.4×(d−t−s)} between the first and second test electrodes 2 and 3. However, the spark discharge voltage $V_F$ may be read to be slightly higher than {8×(t+s)+0.4×(d−t−s)} e.g. if the defect in the reference insulator 5 is longer in length than (d−t−s) or due to measurement errors. For this reason, the spark discharge voltage $V_F$ is herein determined to be lower than the multiplication value of {8×(t+s)+0.4×(d−t−s)} by a safety factor of 1.3 in order to eliminate the negative effects of the measurement errors etc. for higher accuracy in the defect detection test.

The program goes to step S16 when the equation (3) is satisfied. The program goes to step S17 when the equation (3) is not satisfied.

At step S16, the reference insulator 5 is judged as a defective product.

At step S17, the voltage to the second test electrode 3 is gradually decreased.

At step 18, the occurrence or non-occurrence of the spark discharge is monitored. In the occurrence of the spark discharge, the program goes back to step S17. The program goes to step S19 at the time when the spark discharge ceases.

At step S19, the voltage between the first and second test electrodes 2 and 3 at the time of cease of the spark discharge is checked and determined as the test voltage $V_C$. After that, the program proceeds to the current detection process.

In this way, the test voltage determination process is carried out to not only determine the test voltage $V_C$ but also judge the presence or absence of the defect in the reference insulator 5. This makes it possible to determine the test area and test voltage $V_C$ more properly by means of the reference insulator 5, and by extension, to test the ceramic insulator 11 more accurately. The same goes for the second and third embodiments.

Further, each of the distance between the ceramic insulator 11 and the first test electrode 2 and the distance between the ceramic insulator 11 and the second test electrode 3 (3$a$, 3$b$, 3$c$) is preferably controlled to 1.0 mm or smaller so as to increase the field intensity between the first and second test electrodes 2 and 3 (3$a$, 3$b$, 3$c$) to a higher level for further improvements in test accuracy.

The test area and test voltage $V_C$ ($V_{C1}$, $V_{C2}$, $V_{C3}$) may be determined in advance according to various parameters such as the reference voltage $V_L$ ($V_{L1}$, $V_{L2}$, $V_{L3}$) and the material, shape and size of the reference insulator 5, rather than determined by actually placing the reference insulator 5 between the first and second test electrodes 2 and 3 (3$a$, 3$b$, 3$c$) and applying the reference voltage $V_L$ ($V_{L1}$, $V_{L2}$, $V_{L3}$) as in the first to third embodiments. The reference voltage $V_L$ ($V_{L1}$, $V_{L2}$, $V_{L3}$) may be determined in advance according to various parameters such as the material, shape and size of the reference insulator 5.

The potential defect in the ceramic insulator 11 may be developed through the application of the test voltage $V_C$ ($V_{C1}$, $V_{C2}$, $V_{C3}$).

Although the first test electrode 2 is formed of conductive metal in the first to third embodiments, the first test electrode 2 may alternatively be formed of a conductive rubber material or any other conductive material. For example, the first test electrode 2 can be formed of conductive rubber with a hollow structure and expanded by air pressure supply at the defect detection test so as to come into contact with the ceramic insulator 11 and thereby increase the field intensity between the first and second test electrodes 2 and 3 (3*a*, 3*b*, 3*c*) to a higher level for further improvements in test accuracy.

A cap of insulating material such as silicon rubber may be put on the front opening of the axial through hole 12 of the ceramic insulator 11 or the front opening of the axial through hole of the reference insulator 5 during the test area determination process, the test voltage determination process and the current detection process, so as to prevent the flashover more effectively and increase to the test voltage $V_C$ ($V_{C1}$, $V_{C2}$, $V_{C3}$) to a higher value.

Four or more second test electrodes may be provided although three second test electrodes 3*a*, 3*b* and 3*c* are provided in the third embodiment.

Although the first and second test electrodes 2 and 3 (3*a*, 3*b*, 3*c*) are connected to the ground and the power source 51, the first and second test electrodes 2 and 3 (3*a*, 3*b*, 3*c*) may alternatively be connected to the power source 51 and the ground, respectively. As another alternative, both of the first and second test electrodes 2 and 3 (3*a*, 3*b*, 3*c*) are connected to the respective power sources so that the power sources apply different voltages to the first and second test electrodes 2 and 3 (3*a*, 3*b*, 3*c*) to thereby develop a potential difference between the first and second test electrodes 2 and 3 (3*a*, 3*b*, 3*c*).

Although the holder 15 is kept electrically isolated in the second and third embodiments, the holder 15 may also be used as the test electrode by the application of the test voltage $V_C$ ($V_{C1}$, $V_{C2}$, $V_{C3}$)to the holder 15.

In the first embodiment, the small-diameter portion 6 may not be provided to the first test electrode 2, thereby increasing the distance L between the points X and Y along the reference insulator 5 so as to test a wider part of the ceramic insulator 11 with higher accuracy due to an increase in flashover voltage $V_F$.

The entire contents of Japanese Patent Application No. 2007-164555 (filed on Jun. 22, 2007) are herein incorporated by reference.

Although the present invention has been described with reference to the above specific embodiments, the invention is not limited to these exemplary embodiments. Various modification and variation of the embodiments described above will occur to those skilled in the art in light of the above teachings. The scope of the invention is defined with reference to the following claims.

What is claimed is:

1. A test method for a cylindrical spark plug insulator, comprising:

providing a first test electrode having either a rod shape or a column shape, a second test electrode and a reference insulator formed of the same material and having the same shape and size as the spark plug insulator;

determining a reference voltage to be higher than or equal to a short-circuit voltage between the first and second test electrodes when the first and second test electrodes are located apart from each other with a predetermined space left there between for placement of the spark plug insulator;

determining a test area in which the second test electrode can be moved along an outer peripheral side of the reference insulator without the occurrence of a flashover under the application of the reference voltage between the first and second test electrodes when the first test electrode is in a position in an axial hole of the reference insulator corresponding to a given part of the spark plug insulator to be tested;

determining a test voltage to be a maximum value lower than a flashover voltage of the reference insulator between the first and second test electrodes when the first test electrode is in said position in the axial hole of the reference insulator and the second test electrode is within the test area on the outer peripheral side of the reference insulator;

placing the spark plug insulator between the first and second test electrodes by inserting the first test electrode in an axial hole of the spark plug insulator and arrange the second test electrode on an outer peripheral side of the spark plug insulator;

after said placing, detecting an electric current between the first and second test electrodes under the application of the test voltage between the first and second test electrodes while fixing the first test electrode in position relative to the spark plug insulator and moving the second test electrode to an arbitrary position within the test area along the outer peripheral side of the spark plug insulator; and judging the presence or absence of a defect in the spark plug insulator based on the detected electric current between the first and second test electrodes.

2. The test method according to claim 1, wherein, in said test area determining step, the test area is determined by actually placing the reference insulator between the first and second test electrodes and moving the second test electrode along the outer peripheral side of the reference insulator under the application of the reference voltage to the second test electrode while holding the first test electrode in said position.

3. The test method according to claim 1, wherein, in said test voltage determining step, the test voltage is determined to satisfy the following equation (1) with respect to the shortest flashover path between the first and second test electrodes along the reference insulator:

$$8\times(t+s)+0.4\times L>V_C\geqq 2\times d \qquad (1)$$

where $V_C$ (kV) is the test voltage; t (mm) is the shortest distance from the reference insulator to a point on the first test electrode corresponding to one end of said shortest flashover path; s (mm) is the shortest distance from the reference insulator to a point on the second test electrode corresponding the other end of said shortest flashover path; L (mm) is the shortest distance between points on the reference insulator located at the distances t and s from said points on the first and second test electrodes; and d (mm) is the shortest distance between the first and second test electrodes.

4. The test method according to claim 1, wherein, in said test voltage determining step, the test voltage is set to able to generate a field intensity of 5 kV/mm or higher at a surface of the spark plug insulator and to satisfy the following equation (2) with respect to the shortest flashover path between the first and second test electrodes along the reference insulator:

$$8\times(t+s)+0.4\times L>V_C \qquad (2)$$

where $V_C$ (kV) is the test voltage; t (mm) is the shortest distance from the reference insulator to a point on the first test electrode corresponding to one end of said shortest flashover path; s (mm) is the shortest distance from the reference insulator to a point on the second test electrode corresponding the other end of said shortest flashover path; and L (mm) is the shortest distance between points on the reference insulator located at the distances t and s from said points on the first and second test electrodes.

5. The test method according to claim 1, wherein said test voltage determining step includes:

increasing a voltage between the first and second test electrodes to determine the voltage between the first and second test electrodes at which a spark discharge occurs as a spark discharge voltage;

examining whether the spark discharge voltage satisfies the following equation (3) with respect to the shortest flashover path between the first and second test electrodes along the reference insulator;

$$V_F < 1.3\times\{8\times(t+s)+0.4\times(d-t-s)\} \quad (3)$$

where $V_F$ (kV) is the spark discharge voltage; t (mm) is the shortest distance from the reference insulator to a point on the first test electrode corresponding to one end of said shortest flashover path; s (mm) is the shortest distance from the reference insulator to a point on the second test electrode corresponding the other end of said shortest flashover path; and d (mm) is the shortest distance between the first and second test electrodes;

when the equation (3) is satisfied, judging the reference insulator as a defective product; and when the equation (3) is unsatisfied, decreasing the voltage applied between the first and second test electrodes to determine the voltage between the first and second test electrodes at which the spark plug ceases as the test voltage.

6. The test method according to claim 1, wherein the spark plug insulator is tested simultaneously at a plurality of points by providing a plurality of second test electrodes axially apart from each other relative to the first test electrode, determining test areas and test voltages for the respective second test electrodes and detecting electric currents between the first test electrode and the second test electrodes under the application of the test voltages to the second test electrodes while connecting the first test electrode to a ground and arranging the second test electrodes within the test areas, respectively.

7. The test method according to claim 6, wherein, in said test voltage determining step, the test voltages are determined individually by arranging each of the second test electrodes within a corresponding one of the test areas.

8. The test method according to claim 1, wherein each of distances between the spark plug insulator and the first test electrode and between the spark plug insulator and the second test electrode is controlled to 1.0 mm or smaller.

9. A test apparatus for a cylindrical spark plug insulator, comprising:

a first test electrode having either a rod shape or a column shape;

a second test electrode;

a reference insulator formed of the same material and having the same shape and size as the spark plug insulator;

an ammeter capable of measuring an electric current between the first and second test electrodes;

a power source capable of applying a voltage between the first and second test electrodes; and a control unit configured to:

determine a reference voltage to be higher than or equal to a short-circuit voltage between the first and second test electrodes when the first and second test electrodes are located apart from each other with a predetermined space left therebetween for placement of the spark plug insulator;

determine a test area in which the second test electrode can be moved along an outer peripheral side of the reference insulator without the occurrence of a flashover under the application of the reference voltage between the first and second test electrodes when the first test electrode is in a position in an axial hole of the reference insulator corresponding to a given part of the spark plug insulator to be tested;

determine a test voltage to be a maximum value lower than a flashover voltage of the reference insulator between the first and second test electrodes when the first test electrode is in said position in the axial hole of the reference insulator and the second test electrode is within the test area on the outer peripheral side of the reference insulator;

cause the power source to apply the test voltage between the first and second test electrodes;

read the electric current between the first and second test electrodes from the ammeter under the application of the test voltage between the first and second test electrodes when the first test electrode is fixed in position in an axial hole of the spark plug insulator and the second test electrode is arranged in an arbitrary position within the test area on the outer peripheral side of the spark plug insulator; and judge the presence or absence of a defect in the spark plug insulator based on the electric current between the first and second test electrodes.

* * * * *